US010997841B2

(12) United States Patent
Yoshida et al.

(10) Patent No.: US 10,997,841 B2
(45) Date of Patent: May 4, 2021

(54) INFORMATION PROCESSING APPARATUS, INFORMATION PROCESSING SYSTEM AND INFORMATION PROCESSING METHOD

(71) Applicant: TOYOTA JIDOSHA KABUSHIKI KAISHA, Toyota (JP)

(72) Inventors: Kosuke Yoshida, Nagakute (JP); Shugen Yamamura, Nagoya (JP); Hiroto Inoue, Nagakute (JP); Masatoshi Hayashi, Nisshin (JP); Yoshino Yamamori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/587,655

(22) Filed: Sep. 30, 2019

(65) Prior Publication Data

US 2020/0126385 A1 Apr. 23, 2020

(30) Foreign Application Priority Data

Oct. 17, 2018 (JP) ............................ JP2018-195859

(51) Int. Cl.
*B60Q 1/00* (2006.01)
*G08B 21/02* (2006.01)
*G08B 25/01* (2006.01)
*G08B 25/10* (2006.01)

(52) U.S. Cl.
CPC ........... *G08B 21/02* (2013.01); *G08B 25/016* (2013.01); *G08B 25/10* (2013.01)

(58) Field of Classification Search
CPC ....... G08B 21/02; G08B 25/016; G08B 25/10
USPC ........................................................ 340/425.5
See application file for complete search history.

(56) References Cited

U.S. PATENT DOCUMENTS

| | | | | |
|---|---|---|---|---|
| 6,243,685 | B1 * | 6/2001 | Welch | B60Q 1/503 340/426.24 |
| 6,304,174 | B1 * | 10/2001 | Smith | B60Q 1/503 340/425.5 |
| 2008/0089288 | A1 * | 4/2008 | Anschutz | G06Q 30/02 370/331 |
| 2010/0114664 | A1 * | 5/2010 | Jobin | G06Q 10/06 705/7.29 |
| 2010/0268589 | A1 * | 10/2010 | Wesby | G06Q 30/0224 705/14.25 |

(Continued)

FOREIGN PATENT DOCUMENTS

| | | |
|---|---|---|
| CN | 107040866 A | 8/2017 |
| JP | 2002-029387 A | 1/2002 |
| WO | 2016/153564 A1 | 9/2016 |

*Primary Examiner* — Kerri L McNally
*Assistant Examiner* — Thang D Tran
(74) *Attorney, Agent, or Firm* — Oliff PLC

(57) ABSTRACT

An information processing apparatus including: a communicator; and a processor configured to receive help request information that is information for requesting help and positional information of a user terminal of a user in a vehicle from the user terminal via the communicator, based on the positional information of the user terminal, identify a first advertisement display apparatus that is located within a predetermined distance range from the user terminal and satisfies a predetermined condition, and transmit an instruction to display a help request message corresponding to the help request information, to the first advertisement display apparatus via the communicator is provided.

6 Claims, 5 Drawing Sheets

(56) References Cited

U.S. PATENT DOCUMENTS

2011/0055733 A1* 3/2011 Hamilton, II ......... A63F 13/358 715/757
2011/0070898 A1* 3/2011 Sanjeev ................ H04W 4/029 455/456.2
2011/0258895 A1* 10/2011 Rodgers, Jr. .............. G09F 9/00 40/447
2012/0171960 A1* 7/2012 Oshinsky ............ H04M 1/7253 455/41.2
2012/0303426 A1* 11/2012 Morad ................... G06Q 30/02 705/14.4
2013/0013414 A1* 1/2013 Haff ................... G06Q 30/0241 705/14.64
2014/0015663 A1* 1/2014 Uno ...................... B60W 40/09 340/439
2014/0164128 A1* 6/2014 Takeda ............... G06Q 30/0251 705/14.58
2014/0253326 A1* 9/2014 Cho ....................... G08B 7/066 340/539.13
2015/0149285 A1* 5/2015 Schroeter .............. H04W 4/027 705/14.58
2015/0243165 A1* 8/2015 Elsheemy ............... B60R 25/00 340/906
2016/0012730 A1* 1/2016 Jarrell .................. G08G 5/0069 701/8
2016/0014585 A1* 1/2016 Sundararaj .............. H04W 4/90 455/404.1
2016/0098925 A1* 4/2016 Bhogal .................. G08G 1/017 340/902
2016/0283979 A1* 9/2016 Chatterton ......... G06Q 30/0261
2016/0285963 A1* 9/2016 Kaminosono ........... H04L 67/10
2017/0086045 A1* 3/2017 Lucero .................. H04W 76/50
2017/0124853 A1* 5/2017 Mehta ............... H04M 1/72536
2017/0293610 A1* 10/2017 Tran .................... G10L 15/1815
2017/0301220 A1* 10/2017 Jarrell .................... G08B 25/10
2017/0310827 A1* 10/2017 Mehta ............... H04M 3/42357
2017/0318437 A1* 11/2017 Anikin ................ G06F 16/7867
2017/0337794 A1* 11/2017 Zechlin ................... H04W 4/90
2018/0130387 A1* 5/2018 Greenfield .............. G09F 13/22
2018/0182232 A1* 6/2018 Anaya ..................... H04W 4/02
2018/0300761 A1* 10/2018 Pittman ................... H04W 4/02
2019/0108484 A1* 4/2019 Watanabe ................ G07G 1/01

* cited by examiner

*FIG. 4*

SIGNAGE INFORMATION DB

| SIGNAGE ID | POSITION | ADDRESS |
|---|---|---|
| B001 | xxx,yyy | pppp |
| | | |

INFORMATION PROCESSING APPARATUS, INFORMATION PROCESSING SYSTEM AND INFORMATION PROCESSING METHOD

CROSS REFERENCE TO RELATED APPLICATION

This application claims the benefit of Japanese Patent Application No. 2018-195859, filed on Oct. 17, 2018, which is hereby incorporated by reference herein in its entirety.

BACKGROUND

Technical Field

The present disclosure relates to an information processing apparatus, an information processing system and an information processing method.

Description of the Related Art

Vehicle crime prevention monitoring systems in which if a group of words that are highly likely to relate to crime is acquired from voice of a passenger in a taxi by means of voice recognition, such information is transmitted to a base station and an alarm is displayed on a display of a personal computer are disclosed (for example, Patent document 1).

CITATION LIST

Patent Document

[Patent document 1] Japanese Patent Laid-Open No. 2002-29387

However, in patent document 1, an alarm is displayed on the base station-side personal computer alone. Therefore, no alarm is displayed around a site at which a criminal act is actually being committed, and thus, for example, there may be a large time lag between display of an alarm and a rush to the site for help, resulting in failure to efficiently respond to a crime inside a vehicle.

An object of an aspect of the disclosure is to provide an information processing apparatus, an information processing system and an information processing method that enable enhancing efficiency of a response to a request for help for an emergency occurring inside a vehicle from an occupant inside the vehicle.

SUMMARY

An aspect of the present disclosure provides
an information processing apparatus including:
a communicator; and
a processor configured to
receive help request information that is information for requesting help and positional information of a user terminal of a user in a vehicle from the user terminal via the communicator,
identify a first advertisement display apparatus that is located within a predetermined distance range from the user terminal and satisfies a predetermined condition, based on the positional information of the user terminal, and
transmit an instruction to display a help request message corresponding to the help request information, to the first advertisement display apparatus via the communicator.

Another aspect of the present disclosure provides
an information processing system including:
a communicator; and
a processor configured to
receive help request information that is information for requesting help and positional information of a user terminal of a user in a vehicle from the user terminal via the communicator,
identify a first advertisement display apparatus that is located within a predetermined distance range from the user terminal and satisfies a predetermined condition, based on the positional information of the user terminal, and
transmit an instruction to display a help request message corresponding to the help request information, to the first advertisement display apparatus via the communicator.

Another aspect of the present disclosure provides
an information processing method including:
receiving help request information that is information for requesting help and positional information of a user terminal of a user in a vehicle from the user terminal via a communicator;
identifying a first advertisement display apparatus that is located within a predetermined distance range from the user terminal and satisfies a predetermined condition, based on the positional information of the user terminal; and
transmitting an instruction to display a help request message corresponding to the help request information, to the first advertisement display apparatus via the communicator.

The present disclosure enables enhancing efficiency of a response to a request for aid for an emergency occurred inside a vehicle from an occupant inside the vehicle.

BRIEF DESCRIPTION OF DRAWINGS

FIG. 4 is a diagram illustrating an example of signage information stored in the signage information DB.

DESCRIPTION OF THE EMBODIMENTS

An aspect of the present disclosure provides an information processing apparatus including a communicator and a processor. The processor may receive help request information that is information for requesting help and positional information of a user terminal of a user in a vehicle from the user terminal via the communicator. Based on the positional information of the user terminal, the processor may identify a first advertisement display apparatus that is located within a predetermined distance range from the user terminal and satisfies a predetermined condition. Furthermore, the processor may transmit an instruction to display a help request message corresponding to the help request information, to the first advertisement display apparatus via the communicator.

According to the aspect of the present disclosure, as a result of transmission of help request information from a user terminal, a help request message is displayed on a first advertisement display apparatus. Since the first advertisement display apparatus is located within a predetermined distance range from the user terminal, enabling notification of a help request to a person present at a position closer to a vehicle carrying a user of the user terminal. Consequently, for example, a person who has seen the help request message displayed on the first advertisement display apparatus call police or directly goes to the vehicle for help, enabling a help activity to be started more quickly. Therefore, the aspect of the present disclosure enables enhancing efficiency of a response to a request for help for an emergency occurring inside a vehicle from an occupant inside the vehicle.

Also, in the aspect of the present disclosure, the predetermined condition may include that the first advertisement display apparatus is located behind the vehicle. When a vehicle carrying a user of a user terminal is running, a help request message is displayed on an advertisement display apparatus after the vehicle passes therethrough. As a result, for example, in case where an emergency occurring in the vehicle is a crime, a criminal is less likely to become aware of the help request message, enabling suppression of encouragement of the crime.

Also, in the aspect of the present disclosure, the predetermined condition may include that the first advertisement display apparatus is installed in a vicinity of a building related to police. Consequently, a police official is highly likely to see a help request message displayed on a first advertisement display apparatus and display of the help request message on the first advertisement display apparatus itself serves as a report to police. Consequently, a help activity is started more quickly.

Hereinafter, an embodiment of the present disclosure will be described with reference to the drawings. The configuration of the following embodiment is merely an example, and the present disclosure is not limited to the configuration of the embodiment.

First Embodiment

Figure 1:
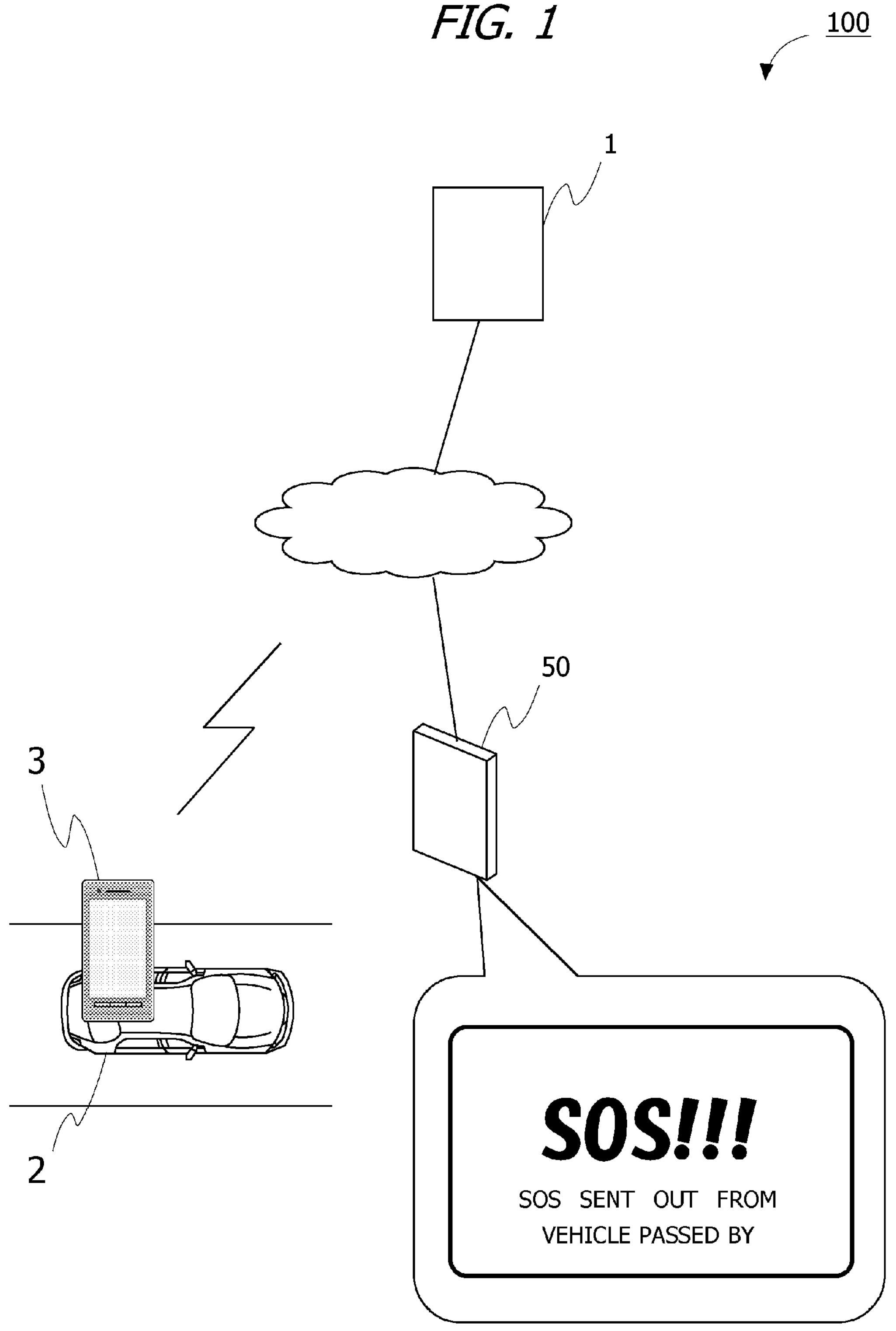
FIG. 1 is a diagram illustrating an example of a system configuration of an in-vehicle emergency notification system according to a first embodiment.

FIG. 1 is a diagram illustrating an example of a system configuration of an in-vehicle emergency notification system 100 according to a first embodiment. The in-vehicle emergency notification system 100 is, for example, a system that causes notification of a request for help for an emergency occurring inside a vehicle from a user terminal of an occupant in the vehicle to be provided by an advertisement display apparatus located around the vehicle. Examples of an emergency that is likely to occur inside a vehicle include, e.g., an accident and a criminal act. Examples of an accident occurring inside a vehicle include, e.g., a fire and sudden illness of an occupant. Examples of a criminal act occurring inside a vehicle include, e.g., an assault, a robbery, a threat and an abduction.

The in-vehicle emergency notification system 100 includes, for example, a center server 1, a plurality of user terminals 3 and digital signage boards 50. In FIG. 1, for ease of description, a vehicle 2 is also illustrated. Also, in FIG. 1, for simplicity of illustration, one user terminal 3 and one digital signage board 50 are illustrated. The user terminal 3 and the digital signage board 50 are, for example, a user terminal and a digital signage board owned by respective users registered with a service of the in-vehicle emergency notification system 100. The center server 1, the user terminal 3 and the digital signage board 50 are each connected to a network that is a public circuit network, for example, the Internet, and can mutually communicate with one another through the network.

The owner of the user terminal 3, that is, the user registered with the in-vehicle emergency notification system 100, may be a driver of the vehicle 2 or a user riding in the vehicle 2. The user terminal 3 is, for example, a terminal that is carried by a user and has a wireless communication function, such as a smartphone, a tablet terminal, a mobile phone terminal or a mobile game instrument. On the user terminal 3, for example, a predetermined application for receiving the service provided by the in-vehicle emergency notification system 100 is installed. For example, the application is an application that is consistently active during the user terminal 3 running and enables transmission of a help request to the center server 1 via a predetermined single operation or enables performance of a process from activation to transmission of a help request to the center server 1 via a single operation such as tapping on an icon.

Also, the user terminal 3 has a function for acquiring positional information. The positional information acquisition function of the user terminal 3 is provided by, for example, a GPS (Global Positioning System) receiver or a Wi-Fi communication instrument.

For example, if an emergency occurs inside the vehicle, the user of the user terminal 3 can make a help request by performing a predetermined operation of the user terminal 3. In other words, upon reception of an input via a predetermined operation by the user, the user terminal 3 transmits help request information to the center server 1. The user's operation of the user terminal 3 for transmitting help request information is a simple operation, for example, tapping on an icon or pressing a predetermined hardware button. In the help request information, for example, information indicating that the user of the user terminal 3 is requesting help is included. In the help request information, e.g., identification information of the user of the user terminal 3 and/or a message input by the user of the user terminal 3 may be included in addition to the above information. Also, together with the help request information, positional information of the user terminal 3 is transmitted to the center server 1.

The digital signage board 50 is an example of "advertisement display apparatus". An advertisement display apparatus in the in-vehicle emergency notification system is not limited to a digital signage board 50 and may be, for example, a display on a shop wall if the display has a function to communicate with the center server 1 through, e.g., the Internet.

In the first embodiment, the center server 1 is allowed to designate a display content to be displayed on the digital signage board 50, by a manager of the digital signage board 50. Upon reception of the help request information from the user terminal 3, the center server 1 identifies a digital signage board 50 that is located within a predetermined distance range from the user terminal 3 and satisfies a predetermined condition, based on the positional information of the user terminal 3 received together with the help request information. The predetermined distance range for identifying a digital signage board 50 is, for example, a range of 5 to 100 m from the user terminal 3. However, the present disclosure is not limited to this example. Also, a condition for identifying a digital signage board is, for example, that the digital signage board is located behind the vehicle carrying the user of the user terminal 3. This is because if the emergency is a crime, a criminal can be prevented from becoming aware of the user of the user terminal 3 making the help request. However, the condition for identifying a digital signage board is not limited to this example and may be that the digital signage board is located around a building related to police such as a police box or a police station and may include the both. One digital signage board 50 or a plurality of digital signage boards 50 may be identified. The digital signage board 50 identified by the center server 1 is an example of "first advertisement display apparatus".

Next, the center server 1 transmits help request screen information including a help request message and a display instruction to the identified digital signage board 50. The help request message may be, for example, a fixed phrase provided in advance, or if a message input by the user of the user terminal 3 is included in the help request information, may be the message. Also, if information indicating a type of the emergency is included in the help request information, the help request message may be a message according to the type of the emergency included in the help request information from among messages provided in advance for respective types of emergencies.

The digital signage board 50 that has received the help request screen information and the display instruction from the center server 1 makes a switch from advertisement to a help request screen. Consequently, notification of the help request of the user in the vehicle 2 can be provided from the digital signage board 50 located around the vehicle 2. A passerby or the like sees the help request screen displayed on the digital signage board 50 and notifies an appropriate agency such as police, enabling making a quick response to the help request of the user in the vehicle 2. Also, the digital signage board 50 on which the help request screen is displayed is located at a site close to the vehicle 2 that the user who has made the help request rides in, and thus, the position of the vehicle 2 can easily be identified, enabling making a quick response to the help request of the user in the vehicle 2.

Figure 2:
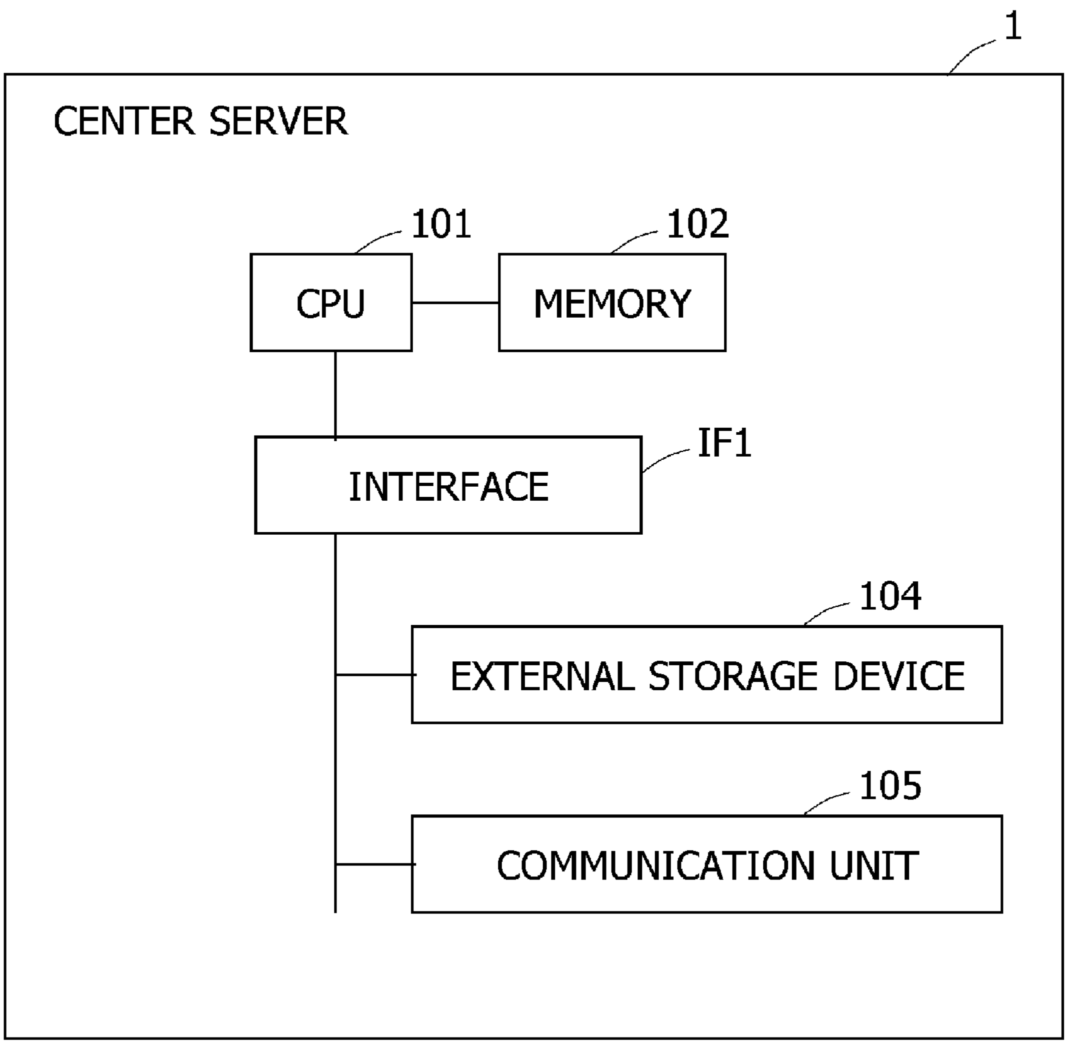
FIG. 2 is a diagram illustrating an example hardware configuration of the center server.

FIG. 2 is a diagram illustrating an example hardware configuration of the center server 1. The center server 1 is, for example, a dedicated computer or a general-purpose computer. The center server 1 includes a CPU (central processing unit) 101, a memory 102, an interface IF1, an external storage device 104 and a communication unit 105 as hardware components. Each of the memory 102 and the external storage device 104 is a computer-readable recording medium. The center server 1 is an example of "information processing apparatus".

The interface IF1 interconnects the CPU 101, the external storage device 104 and the communication unit 105. The external storage device 104 stores various programs and data to be used by the CPU 101 for execution of each program. The external storage device 104 is, for example, an EPROM (erasable programmable ROM) or a hard disk drive. The programs held in the external storage device 104 include, for example, an operating system (OS), a control program for the in-vehicle emergency notification system 100 and various other application programs. The control program for the in-vehicle emergency notification system 100 is a program for identifying an advertisement display apparatus in response to help request information from a user terminal 3 and causing the identified advertisement display apparatus to provide notification of a help request message.

The memory 102 is a main memory that provides a memory area and a work area in which programs stored in the external storage device 104 are loaded, for the CPU 101, or is used as a buffer. The memory 102 includes, for example, a semiconductor memory such as a ROM (read-only memory) or a RAM (random access memory).

The CPU 101 performs various types of processing by loading the OS and various application programs held in the external storage device 104 to the memory 102 and executing the OS and various application programs. The present disclosure is not limited to a case where a single CPU 101 is provided and a plurality of CPUs 101 may be provided. The CPU 101 is an example of "processor".

The communication unit 105 is an interface via which information is input/output to/from a network. The communication unit 105 may be an interface that connects to a wired network or an interface that connects to a wireless network. Examples of the communication unit 105 include, e.g., an NIC (network interface card) and a wireless circuit. The communication unit 105 is an example of "communicator".

Note that the hardware configuration of the center server 1 illustrated in FIG. 2 is a mere example, and the present disclosure is not limited to this example and appropriate omission, replacement and addition of components are possible according to the embodiment. For example, the center server 1 may include a removable recording medium drive device and execute a program recorded in a removable recording medium. The removable recording medium is, for example, a recording medium such as an SD card, a miniSD card, a microSD card, a USB (Universal Serial Bus) flash memory, a CD (compact disc), a DVD (digital versatile disc), a Blu-ray (registered trademark) disc or a flash memory card. Also, for example, the center server 1 may include an input device and an output device. Examples of the input device include, e.g., a keyboard, a mouse and a touch panel. Examples of the output device include, e.g., a display.

Note that a sequence of processing performed by the center server 1 is not only implemented by execution of software by the CPU 101 but also may be implemented, for example, by hardware such as a FPGA (field-programmable gate array).

Figure 3:
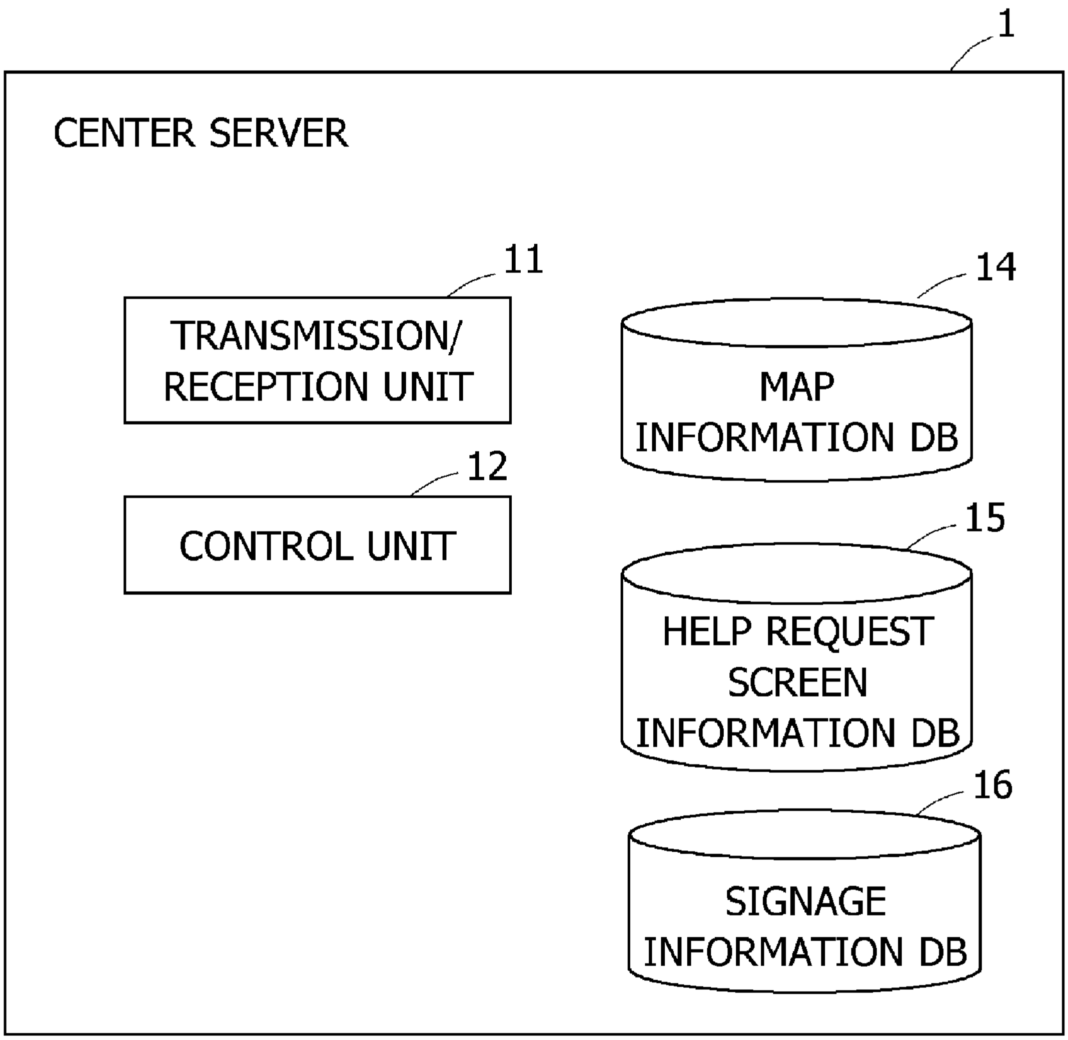
FIG. 3 is a diagram illustrating an example functional configuration of the center server according to the first embodiment.

FIG. 3 is a diagram illustrating an example functional configuration of the center server 1 according to the first embodiment. The center server 1 includes a transmission/reception unit 11, a control unit 12, a map information database (DB) 14, a help request screen information DB 15 and signage information DB 16 as functional components. These functional components are, for example, functional components implemented by execution of the control program for the in-vehicle emergency notification system 100 by the CPU 101 of the center server 1.

The transmission/reception unit 11 is, for example, an interface with the user terminals 3 and the digital signage boards, via which data is transmitted/received to/from the user terminals 3 and the digital signage boards 50. In the first embodiment, for example, the transmission/reception unit 11 receives help request information and positional information from a user terminal 3. The help request information and the positional information received from the user terminal 3 are output to, for example, the control unit 12. Also, for example, upon receipt of an input of help request screen information and a display instruction from the control unit 12, the transmission/reception unit 11 transmits the help request screen information to a digital signage board 50 designated by the control unit 12. Here, it is assumed that the positional information of the user terminal 3 received together with the help request information from the user terminal 3 includes a plurality of positional information pieces acquired during a predetermined period of time including a time of an input via an operation for the transmission of the help request information to the user terminal 3.

The control unit 12 receives an input of the help request information and the positional information from the user terminal 3, from the transmission/reception unit 11. Based on the positional information of the user terminal 3 and later-described map information, the control unit 12 identifies a digital signage board 50 located within a predetermined distance range from the user terminal 3 and satisfies a predetermined condition. If the predetermined condition includes that the digital signage board 50 is located behind a vehicle 2 that the user of the user terminal 3 rides in, the control unit 12 acquires a direction of travel of the user terminal 3, that is, a direction of travel of the vehicle 2 from the positional information of the user terminal 3 and identifies a digital signage board 50 located behind the vehicle 2.

The control unit 12 acquires proper help request screen information from the later-described help request screen information DB 15. The proper help request screen information is, for example, screen information including a fixed phrase for notification of a help request such as “SOS!!” or “Help request made from the inside of the vehicle” if, e.g., neither information of a type of emergency nor a message input by the user of the user terminal 3 is included in the help request information. For example, if information of a type of emergency indicating a crime is included in the help request information, help request screen information including a message of a more suitable content such as “I am just caught up in a crime. Please help me” or “Call police” according to the type of emergency is acquired.

The control unit 12 transmits the acquired help request screen information to the identified digital signage board 50. Note that the control unit 12 may include, e.g., information of the vehicle 2, information of the user of the user terminal 3 and/or an address of the digital signage board 50 in the help request screen information in addition to the help request message.

Each of the map information DB 14, the help request screen information DB 15 and the signage information DB 16 is created in, for example, the external storage device 104 of the center server 1. The map information DB 14 stores the map information. In the map information, for example, respective positions of the digital signage boards 50 are plotted and each plot is associated with identification information of the relevant digital signage board 50. Also, e.g., positional information pieces of buildings such as police stations, police boxes, fire stations and hospitals are included in the map information.

In the help request screen information DB 15, for example, a plurality of help request screen information pieces are provided in advance for respective types of in-vehicle emergencies. Each help request screen information piece includes a help request message according to the relevant type of in-vehicle emergency and also includes information of, e.g., a format for display. Each help request screen information piece may include, e.g., data of an image or data of a moving image to be displayed on a help request screen and/or data of sound to be output together with the help request screen.

FIG. 4 is a diagram illustrating an example of signage information stored in the signage information DB 16. In the signage information DB 16, signage information pieces, which are information pieces relating to the digital signage boards 50, are stored. Each signage information piece includes fields such as signage ID, position and address.

Identification information of a relevant digital signage board 50 is input to the signage ID field. The signage information DB 16 and the map information DB 14 are linked with each other by the identification information pieces of the digital signage boards. Positional information of the relevant digital signage board 50 is input to the position field. The positional information of the digital signage board 50 may include, for example, either a latitude and a longitude or an address, or the both. For example, an address used as an address of the relevant digital signage board 50 is input to the address field. Examples of an address used as an address of the digital signage board 50 include, e.g., an IP address and an e-mail address.

Note that information stored in the signage information DB 16 is not limited to the information illustrated in FIG. 4 and appropriate change, addition and deletion are possible according to the embodiment. For example, if, e.g., a password is used for accessing a digital signage board 50, the password is also stored in the signage information DB 16.

<Flow of Processing>

Figure 5:
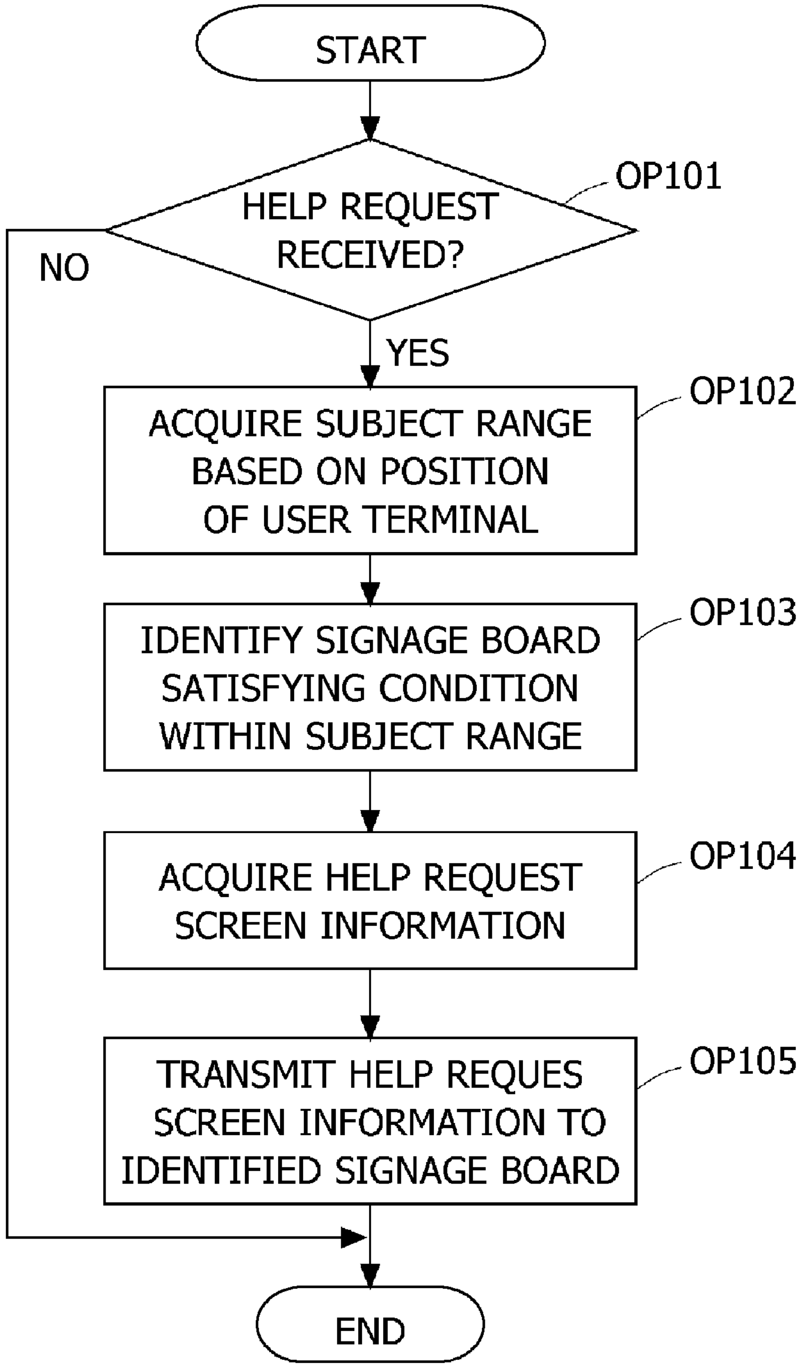
FIG. 5 is an example of a flowchart of help request notification processing in the center server according to the first embodiment.

FIG. 5 is an example of a flowchart of help request notification processing in the center server 1 according to the first embodiment. The processing illustrated in FIG. 5 is repeatedly performed, for example, in a predetermined period. Although an entity that performs the processing illustrated in FIG. 5 is the CPU 101 of the center server 1, for sake of convenience, the processing will be described with a functional component as the entity.

In OP101, the control unit 12 determines whether or not help request information has been received from a user terminal 3. If help request information has been received from a user terminal 3 (OP101: YES), the processing proceeds to OP102. If no help request information has been received from a user terminal 3 (OP101: NO), the processing illustrated in FIG. 5 ends. In the below, “user terminal 3” in FIG. 5 refers to the user terminal 3 that is a source of transmission of the help request information. Also, in the below, “vehicle 2” in FIG. 5 refers to a vehicle 2 that a user of the user terminal 3 that is a source of transmission of the help request information rides in.

In OP102, based on positional information of the user terminal 3 received together with the help request information, the control unit 12 acquires a range subject to identification of a digital signage board 50 from the map information DB 14. The range subject to identification of a digital signage board 50 is, for example, a predetermined distance range from the user terminal 3.

In OP103, the control unit 12 identifies a digital signage board 50 satisfying a predetermined condition within the subject range acquired in OP102. The predetermined condition includes, for example, any of or a plurality of conditions that the digital signage board 50 is located behind the vehicle 2 and the digital signage board 50 is located in the vicinity of a facility such as a police box or a police station. The control unit 12 acquires information relating to the identified digital signage board 50 from the signage information DB 16.

In OP104, the control unit 12 acquires help request screen information according to the help request information from the help request screen information DB 15. In OP105, the control unit 12 transmits the help request screen information acquired in OP104 to the digital signage board 50 identified in OP103. Subsequently, the processing illustrated in FIG. 5 ends. Note that display of a help request message on a digital signage board 50 is terminated by notification from the center server 1 to the digital signage board 50, for example, when a predetermined length of time has passed, when a call for, e.g., police has been detected or when it is detected that the emergency inside a relevant vehicle 2 has been solved.

Note that the processing illustrated in FIG. 5 is a mere example and, e.g., appropriate changes in sequence of the processing are possible according to the embodiment. For example, each of the processing OP102 and the processing in OP103 may be performed ahead of the other.

Operation and Effects of First Embodiment

According to the first embodiment, if an emergency during a ride in a vehicle 2 occurs, help request information is transmitted from a user terminal 3 to the center server 1 and a help request message is thereby displayed on a digital signage board 50 located within a predetermined distance range from the user terminal 3, that is, the vehicle 2. Consequently, notification of the help request for the emergency occurring inside the vehicle 2 can be provided to people present around the digital signage board 50. A person present around the digital signage board 50 sees the help request message and call police or the person directly goes to the vehicle 2 for help, for example, enabling performance of a quick help activity. Also, at the time of the help request being made, the digital signage board 50 is located within a predetermined range from the vehicle 2, and thus, even if the vehicle 2 is running, a position of the vehicle 2 can easily be estimated, which contributes to performance of a quicker help activity.

Also, in the first embodiment, a help request message is displayed on a digital signage board 50 that is located within a predetermined distance range from a relevant user terminal 3, that is, a relevant vehicle 2 and satisfies a predetermined condition. If the predetermined condition is that the digital signage board 50 is located behind the vehicle 2, a help request message is displayed on a digital signage board 50 located behind the vehicle 2, that is, at a site the vehicle 2 passed through. For example, in case where an emergency occurring inside a vehicle 2 is a crime, a criminal is less likely to become aware of the help request being made, enabling suppression of encouragement of the crime due to rubbing the criminal the wrong way because of the help request being made.

Also, if the predetermined condition is that the digital signage board 50 is located in the vicinity of, e.g., a police box or a police station, a help request message is displayed on a digital signage board 50 located around the vehicle 2 and in the vicinity of, e.g., a police box or a police station. Consequently, a police official who serves in, e.g., a police box or a police station closest to the vehicle 2 is highly likely to see the help request message and the help request message on the digital signage board 50 itself serves as a report to police, enabling a help activity to be performed quickly.

Also, for each digital signage board 50, an existing one installed for advertisement is used, enabling lowering of costs relating to building an infrastructure for implementing the in-vehicle emergency notification system 100 according to the first embodiment. Also, since the digital signage boards 50 are installed for advertisement, the digital signage boards 50 are often installed at respective eye-catching positions and thus a help request message on each digital signage board 50 also catch people's eyes.

Other Embodiments

The embodiment described above is an example, and the present disclosure may be changed and carried out as appropriate without departing from the gist of the present disclosure.

In the first embodiment, a plurality of positional information pieces are transmitted from a user terminal 3 to the center server 1 together with help request information, and based on the plurality of positional information pieces, the center server 1 acquires a direction of travel of the user terminal 3, that is, a relevant vehicle 2. Instead of the above, a user terminal 3 may acquire a direction of travel of the user terminal 3, that is, a relevant vehicle 2 and transmit the direction of the travel of the vehicle 2 to the center server 1 together with help request information and positional information.

Also, the center server 1 may transmit help request screen information to a digital signage board 50 and also transmit, for example, a message or the like indicating that a help request is being made, to a user terminal 3 that is a source of transmission of help request information. Consequently, a sense of ease can be provided to a user of the user terminal 3, the user making the help request.

Also, in a user terminal 3, a function for transmitting help request information may become available in a limited situation, for example, if a user of the user terminal 3 is in a vehicle 2. It may be detected that the user of the user terminal 3 is in the vehicle 2, for example, via an input via the user's predetermined operation of the user terminal 3 for notification of the user getting in the vehicle 2. Consequently, when the user is not in a vehicle 2, it is possible to prevent transmission of help request information to the center server 1 due to, e.g., malfunction.

The center server 1 according to the first embodiment is, for example, a server that performs a service for connecting a driver wishing to provide transportation using a vehicle 2 and a user wishing transportation via vehicle (called a ride-sharing service), and the service of the in-vehicle emergency notification system 100 may be a part of a ride-sharing service. In this case, the center server 1 holds information relating to vehicles 2 to be used for the ride-sharing service and information relating to users of user terminals 3 (drivers of the vehicles 2 or users to ride in the vehicles 2). Therefore, the center server 1 may cause one or more information pieces from among information pieces relating to a vehicle 2 and occupants of the vehicle 2 (including a driver, a user riding in the vehicle and a user of a user terminal 3) to be included in help request screen information including a help request message. Consequently, e.g., information relating to the vehicle 2 and information relating to a criminal are displayed on a digital signage board 50 together with the help request message, enabling quick identification of the vehicle 2 in which an emergency is occurring and the criminal.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing apparatus comprising:
a communicator; and
a processor programmed to:
receive, from a user terminal of a user in a vehicle via the communicator, help request information that is information for requesting rescue of the user from a criminal act occurring inside the vehicle and positional information of the user terminal,
identify a first advertisement display apparatus that is (i) located behind the vehicle and (ii) within a predetermined distance range from the user terminal, based on the positional information of the user terminal, and
transmit an instruction to display a help request message corresponding to the help request information, to the first advertisement display apparatus via the communicator, the help request message indicating that the user in the vehicle requires rescue,
wherein the first advertisement display apparatus is installed at a location separate from the vehicle.

2. The information processing apparatus according to claim 1, wherein the first advertisement display apparatus is installed in a vicinity of a building related to police.

3. The information processing apparatus according to claim 1, wherein the help request message includes information identifying the vehicle in which the user is present.

4. The information processing apparatus according to claim 1, wherein the help request information includes information identifying a direction of travel of the vehicle.

5. An information processing system comprising:
a communicator;
a first advertisement display apparatus; and
a processor programmed to:
receive, from a user terminal of a user in a vehicle via the communicator, help request information that is information for requesting rescue of the user from a criminal act occurring inside the vehicle and positional information of the user terminal,
identify a first advertisement display apparatus that is (i) located behind the vehicle and (ii) within a predetermined distance range from the user terminal, based on the positional information of the user terminal, and
transmit an instruction to display a help request message corresponding to the help request information, to the first advertisement display apparatus via the communicator, the help request message indicating that the user in the vehicle requires rescue,
wherein the first advertisement display apparatus is installed at a location separate from the vehicle.

6. An information processing method comprising:
receiving, from a user terminal of a user in a vehicle via a communicator, help request information that is information for requesting rescue of the user from a criminal act occurring inside the vehicle and positional information of the user terminal;
identifying a first advertisement display apparatus that is (i) located behind the vehicle and (ii) within a predetermined distance range from the user terminal, based on the positional information of the user terminal; and
transmitting an instruction to display a help request message corresponding to the help request information, to the first advertisement display apparatus via the communicator, the help request message indicating that the user in the vehicle requires rescue,
wherein the first advertisement display apparatus is installed at a location separate from the vehicle.

* * * * *